Nov. 24, 1931.    W. GREENHECK    1,833,460
CONTINUOUS PRESSURE CHEESE PRESS
Filed Feb. 14, 1930    2 Sheets-Sheet 1
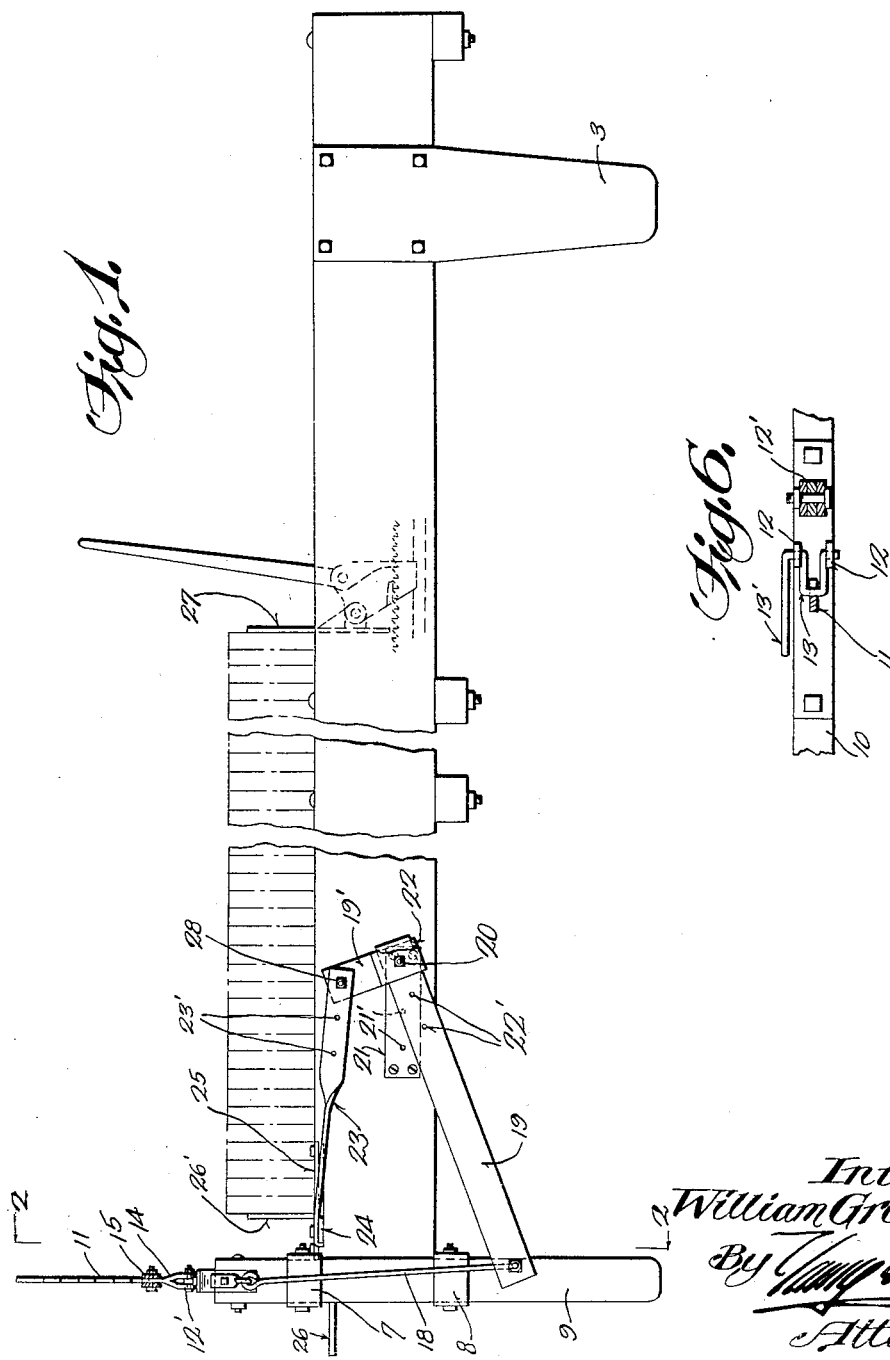
Inventor
William Greenheck
By
Attorneys Nov. 24, 1931.  W. GREENHECK  1,833,460
CONTINUOUS PRESSURE CHEESE PRESS
Filed Feb. 14, 1930   2 Sheets-Sheet 2
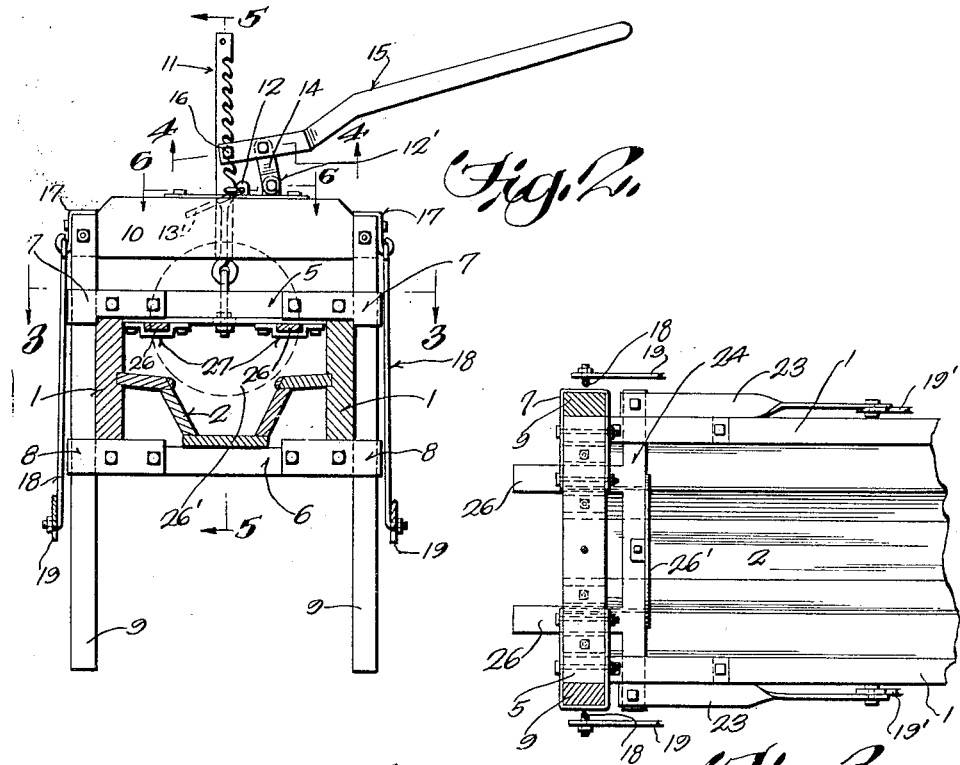
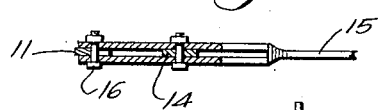
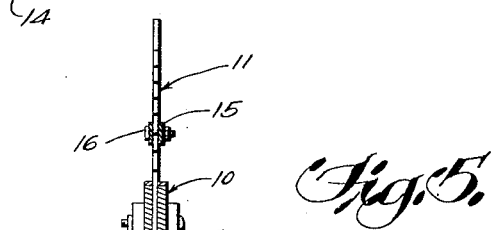
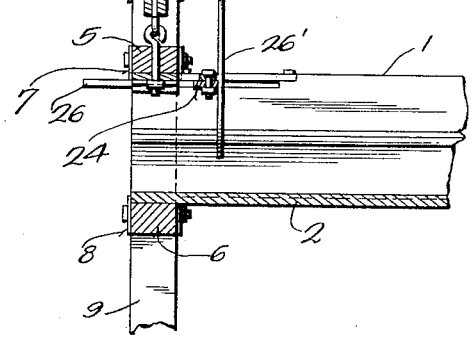
Inventor
William Greenheck
By *(attorneys signature)*
Attorneys Patented Nov. 24, 1931

1,833,460

UNITED STATES PATENT OFFICE

WILLIAM GREENHECK, OF LONE ROCK, WISCONSIN

CONTINUOUS PRESSURE CHEESE PRESS

Application filed February 14, 1930. Serial No. 428,358.

My invention refers to continuous pressure cheese presses, and it has for its object to provide an adjustable lever mechanism associated with a follower-head of a press of this general type, whereby the pressure upon the cheese units is uniform, continuous, and directed in a straight line so as to prevent unevenness in the stacked cheeses when dried.

Another object of my invention is to provide a manually controlled rack lifting means for the floating front end of the cheese box which can be easily and conveniently manipulated to raise the floating end thereof and to lock it under certain conditions when it is desired to unload the box or to load it.

With the above and other minor objects in view, the invention consists in certain peculiarities of construction and combination of mechanical elements which will be fully set forth hereinafter with reference to the accompanying drawings and subsequently claimed.

In the drawings, Figure 1 represents a side elevation of a cheese press embodying the features of my invention;

Figure 2 is a cross section of the front floating end of the press, the section being indicated by line 2—2 of Figure 1;

Figure 3 is a fragmentary plan view of the front end of said press partly in section, as indicated by line 3—3 of Figure 2;

Figure 4 is a detail sectional view of the rack lifting mechanism, the section being indicated by line 4—4 of Figure 2;

Figure 5 is a sectional elevation of the front end of the press, the section being indicated by line 5—5 of Figure 2, and Figure 6 is a fragmentary detail sectional view of the rack controlling mechanism, the section being indicated by line 6—6 of Figure 2.

Referring by characters to the drawings, 1—1 indicates the side members of a cheese box having a trough 2 that is adapted to receive the cheese hoops in the ordinary manner.

The side members carry the usual supporting legs 3 at their rear ends and said side members at their front ends are connected by upper and lower cross bars 5 and 6, respectively. These cross bars carry the stirrups 7 and 8 which slidably engage the side strips 9 of a forwardly positioned yoke, the side or supporting strips of the same being connected by a yoke block 10. This yoke block 10 is centrally slotted for the reception of a rack bar 11, which rack bar is pivotally connected at its lower end to the upper cross bar 5 through an eye-bolt or similar member.

A plate is secured to the upper face of the yoke block 10 having conveniently positioned ears 12 and 12'. As best shown in Figure 6, the ears 12 have mounted therein a U-shaped gravity controlled locking dog 13, which dog is provided with a handle 13' which serves as a weight to hold the dog in its functioning or neutral position, it being understood that said locking dog is adapted to engage the teeth of the rack 11, whereby the floating front end of the cheese box is secured to the front supporting yoke.

The ears 12' are adapted to receive a link 14 which has pivoted thereto a manually operated lever 15. This lever at its front end carries a bolt 16 which is arranged to engage the teeth of the rack bar 11.

The yoke block 10 has secured thereto brackets 17 having eyes which are connected to link rods 18. These link rods are in turn connected to the long arms 19 of bell crank levers, which levers are pivoted by bolts 20 that project from the side members 1, it being understood that these pivot bolts are mounted in plates 21, which carry a plurality of bolt apertures 21', whereby the pivot bolts may be adjusted forwardly or backwardly with relation to the front yoke.

The short arms 19' of the bell crank levers are also adjustable with relation to the long arm, due to the fact that said short arms are provided with end loops 22 which are slidable upon the long arms of the bell crank lever, and said long arms are also provided with bolt apertures 22', whereby adjustment of the leverage may be effected.

The upper ends of the short arms 19' of the bell crank levers are connected by links 23 to a transversely disposed cross plate 24, which cross plate is slidably mounted upon the upper face of the side members 1 and is held in position by straps 25. The cross plates have forwardly extending guide arms 26, which guide arms are slidable in guide straps 27 and are carried by the upper cross bar 5, which cross bar, as previously stated, is supported by, and constitutes part of, the press box.

The cross plate 24 also carries a standard follower-head 26'. Aligned with the follower-head at the rear end of the press box is the usual head block 27 and its associated parts which constitute no part of my invention, it being understood that this head block is adjustable by lever mechanism and locked in its adjusted position.

Attention is also directed to the fact that the links 23, which connect the bell crank levers and cross plate constituting part of the follower-head, are provided with a plurality of bolt holding apertures 23' whereby the pivot bolt 28, which connects the short arm of the bell crank levers, may be changed when said bell crank levers are adjusted for variation in the pressure power, when desired.

Thus, it will be seen that the bell crank lever connections are quickly adjustable for variation in the pressure to be exerted upon the cheese and the mechanism as a whole is thus capable of operating under various conditions that will occur in extracting the whey from cheese units.

It is obvious from the foregoing description that when it is desired to load the press, the floating front end is locked in its high position with relation to the yoke by the rack and gang mechanism, previously described, and after the gang of cheese hoops are in position, the follower-head is moved forward to exert the desired initial pressure upon the gang.

The gravity dog 13 is then disconnected from the rack bar 11 and held in its disconnected position by the handle 13'. The whey of the cheese and press box will then, through the adjustable lever connection, exert a continuous pressure upon the gang of cheese units, and as the whey is extracted, the front floating ends will gradually drop down, whereby a continuous and uniform pressure is exerted upon said cheese units, the short arm of the bell crank lever being swung rearwardly due to the anchorage of the long arm of the levers to the upper portion of the yoke, and consequently in performing this movement, the follower-head and its associated parts will be forced rearwardly to compress said cheese units until such time as there is sufficient whey extracted therefrom.

It is also obvious that when it is desired to remove the cheese units that the rack and lever mechanism is again manipulated to lift the floating end of the cheese press with relation to the front supporting yoke and in so doing the follower-head will recede, whereby pressure is taken off of the gang of cheese units and they can readily be extracted from the press box.

I claim:

1. In a cheese press comprising a press box having a trough, an adjustable head block and a legged supporting yoke at the front end of the box; the combination of a continuous pressure mechanism comprising upper and lower cross-bars carried by the front end of the press box, a transversely disposed cross-plate having forwardly extended arms, guide straps for the arms carried by the upper press box cross-bar, a follower head secured to the cross-plate, a pivoted pair of short and long arm bell-crank levers carried by said press box, links connecting the ends of the cross-plate and the short arm of the bell-crank lever, link rods connecting the upper part of the yoke legs and long arms of said bell-crank lever, whereby the yoke legs constitute the sole load support of the trough, a rack bar in pivotal union with the upper cross-bar of the press box, and means for guiding the rack bar associated with the yoke.

2. In a cheese press comprising a press box having a trough, an adjustable head block, supporting legs at the rear end and a legged supporting yoke at the front end of the press box; the combination of a continuous pressure mechanism comprising upper and lower cross-bars carried by the front end of the press box, stirrups extending therefrom for sliding engagement with the side strips of the legged portions of the yoke, a transversely disposed cross-plate having forwardly extending guide arms, guide straps carried by the upper cross bar for the guide arm, a follower head secured to the aforesaid cross-plate, a pivoted pair of short and long arm bell crank levers carried by said press box, links connecting the ends of the cross-plates and short arms of the bell crank levers, link rods connecting the upper part of the legged supporting yoke and long arms of said bell crank levers, whereby said yoke legs constitute the sole load support of the front end of the press, and means for varying the length of the short and long arms of said bell crank levers.

In testimony that I claim the foregoing I have hereunto set my hand at Lone Rock, in the county of Richland and State of Wisconsin.

WILLIAM GREENHECK.